G. A. AND A. L. BOBRICK.
LIQUID DISPENSER.
APPLICATION FILED FEB. 17, 1916.
1,364,347.
Patented Jan. 4, 1921.
2 SHEETS—SHEET 1.
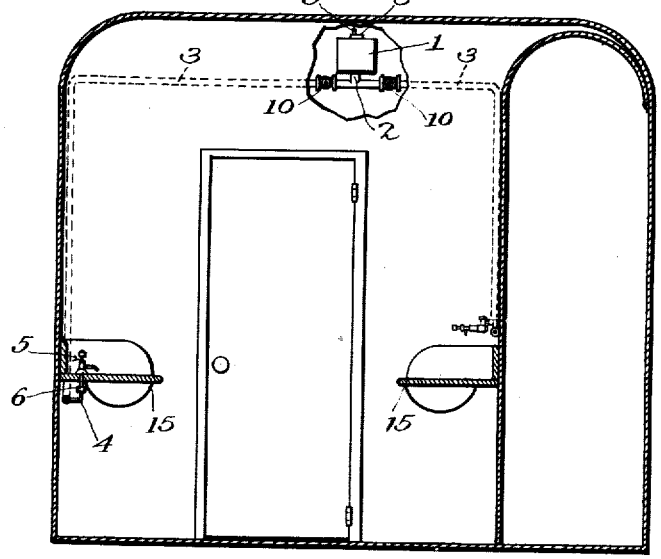
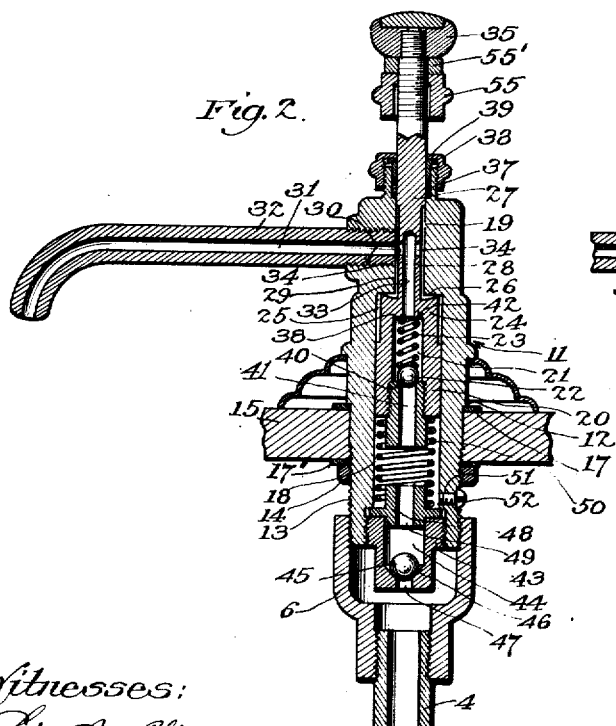
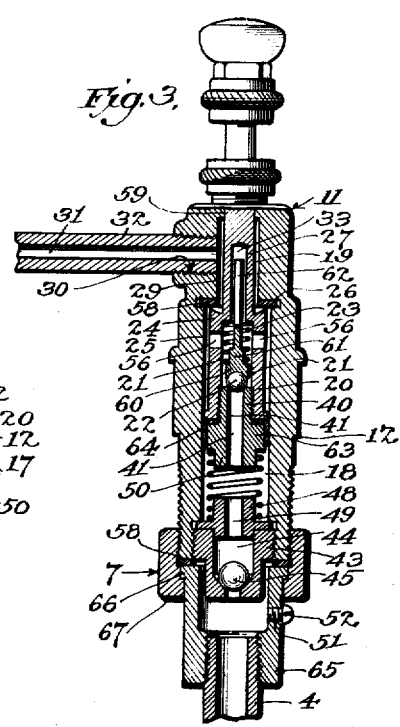
Witnesses:
Inventors:
Gabriel A. Bobrick
Arthur L. Bobrick
By Frederick Whype
Attorneys G. A. AND A. L. BOBRICK.
LIQUID DISPENSER.
APPLICATION FILED FEB. 17, 1916.
1,364,347.
Patented Jan. 4, 1921.
2 SHEETS—SHEET 2.
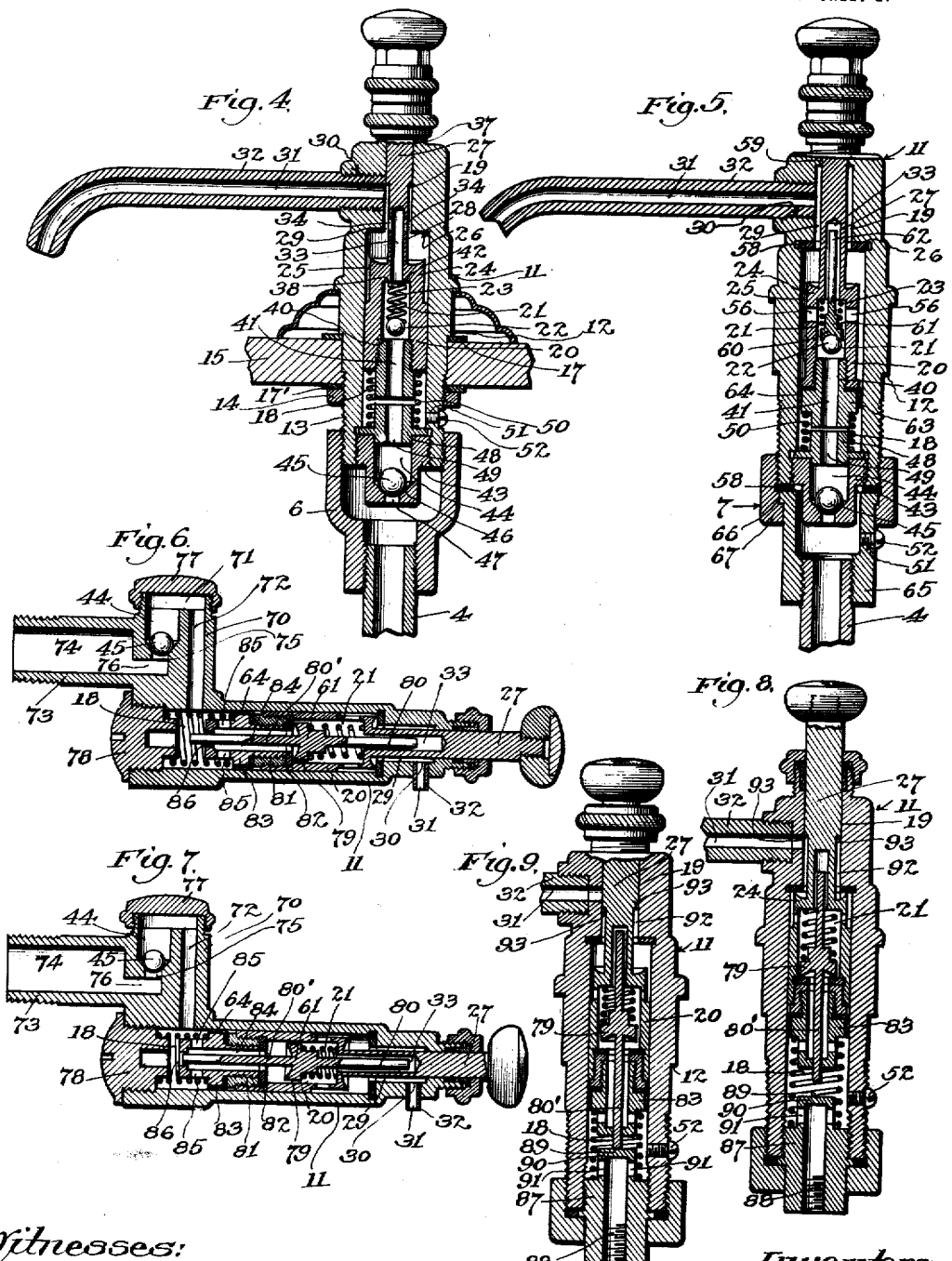
Witnesses:
Inventors:
Gabriel A. Bobrick.
Arthur L. Bobrick.
By Frederick Whyte.
Attorney

UNITED STATES PATENT OFFICE.

GABRIEL A. BOBRICK AND ARTHUR L. BOBRICK, OF LOS ANGELES, CALIFORNIA.

LIQUID-DISPENSER.

1,364,347. Specification of Letters Patent. Patented Jan. 4, 1921.

Application filed February 17, 1916. Serial No. 78,814.

*To all whom it may concern:*

Be it known that we, GABRIEL A. BOBRICK and ARTHUR L. BOBRICK, citizens of the United States of America, and residents of Los Angeles, county of Los Angeles, and State of California, have invented a new and useful Liquid-Dispenser, of which the following is a specification.

This invention relates to apparatus for dispensing measured or predetermined quantities of liquid, and particularly to means for measuring or predetermining the quantity to be dispensed, and dispensing or discharging the same, by means of the force exerted by a piston or plunger.

The invention is particularly adapted for dispensing liquid soap in public lavatories such as the lavatories of sleeping cars, clubs, hotels and the like, where from a single or common reservoir a number of dispensing devices are to be supplied either by gravity or pressure and where the tubes or channels connecting the reservoir with the dispensers are extended horizontally as well as vertically or bent in curves whereby the liquid is required to flow from the reservoir to the dispensers not simply vertically but horizontally and, in many cases, down and up again or vice versa.

An object of the invention is to construct a liquid dispenser which will prevent the entrance of air into the tubes supplying the liquid to the dispenser.

Other objects are to provide such a construction and interrelation of parts as to positively measure or determine the quantity of liquid dispensed by each operation of a plunger or piston; to prevent a continuous flow of liquid when the dispenser is in operation; to provide such a construction and interrelation of parts that the quantity of discharge per stroke of piston or plunger may be regulated as desired; to prevent all leakage from the discharge nozzles so that the liquid is discharged only in the predetermined quantity and at the predetermined time and there is no drip or waste of the liquid.

A further object is to provide such interrelation of parts as shall be extremely simple to make and install and which shall be efficient in operation and cheap to maintain.

The invention consists in the constructions and in the interrelations and combinations of parts hereinafter described and more particularly pointed out in the claims and will be more readily understood by reference to the accompanying drawings, forming a part of this specification, and in which:

Figure 1 is a vertical sectional view of a lavatory, of a sleeping car, having installed therein a reservoir and dispensers embodying our invention;

Fig. 2 is a longitudinal sectional view of a dispensing device embodying our invention the same being shown in normal or closed position;

Fig. 3 is a similar view of a slightly modified form;

Fig. 4 is a similar view of the construction shown in Fig. 2 of the devices in operated position;

Fig. 5 is a similar view of the construction shown in Fig. 3 the parts being in operated position;

Figs. 6 and 7 are similar views of another slightly modified form;

Figs. 8 and 9 are similar views of a further modified form of dispenser embodying our invention.

In Fig. 1 of the drawings we have shown or indicated a liquid supply reservoir 1 having a main tube 2 leading therefrom which is in turn connected to two branch tubes 3, each in turn connected with a tube 4 in turn communicating with the dispensing devices proper 5 which dispensing devices 5 are connected therewith by suitable means such, for instance, as the couplings 6 (Fig. 2) or unions 7 (Fig. 3). The reservoir 1 is preferably provided with an opening by which it may be readily filled. This opening is preferably closed by a cap 8. The cap 8 is preferably provided with a vent 9 and valves or cocks 10 may be interposed between the reservoir 1 and the dispensing devices to close communication between the reservoir and dispensing devices when desired.

In the form of dispenser shown in Figs. 2 and 4 the body 11 is provided with suitable means, such as a shoulder 12, threaded portion 13 and nut 14 for securing the body 11 to the top plate 15 of a wash basin. As shown the body 11 is inserted through an opening made in the plate, resting with the shoulder 12 on top of the plate and secured thereto by the nut 14. A washer 17 may be interposed between the shoulder 12 and the top of the plate 15 and a washer 17' between the nut 14 and the bottom of the plate 15. One or both of said washers may be of the well-known split or lock nut type which when tightened will hold the body 11 securely in its set position. The body 11 is provided with two connecting axially arranged bores 18 and 19 of different diameters, adapted to accommodate the operating parts or mechanism of the dispenser.

A plunger or piston 20 is mounted in the bore, the piston portion being of such diameter as to make a close working fit in the bore 18 of the body 11. The upper portion of the piston 20 is slightly reduced in diameter, as shown, to form the hub 24, thereby leaving an annular space or chamber 25 between such hub and the wall of the bore 18. The end or upper edge of the hub 24 is adapted to abut against the wall 26 of the bore 18 and act as a valve for normally closing communication between the space or chamber 25 and the bore 19 to avoid all possibility of leakage in case the working fit of the piston is not sufficiently close. 27 represents an upward extension of the piston 20 forming a stem or piston rod of smaller diameter than the main piston 20. This piston rod or stem 27 extends through the bore 19 to the outside of the body 11. The portion 28 of the piston rod or stem 27 which connects with the hub 24 of the piston 20 is recessed or made of smaller diameter than the upper end of the piston rod, so as to form an annular space or chamber 29 between the stem 27 and the wall of the bore 19.

As shown the piston 20 is hollow and a portion of its bore 21 is contracted to form toward the upper portion of the piston the channel 33 which also extends within the reduced or stem portion 27. The nozzle 32 is preferably formed separate from the body 11 and provided with a threaded end to screw into the opening 30. The nozzle 32 is provided with a duct or passage 31 and through the opening 30 communicates into the small bore 29. Near the upper end of the channel 33 one or more ports 34 open into the chamber 29.

Preferably the piston stem or rod 27 is provided on its outer end with a suitable push button or handle 35 and a suitable stuffing box is formed about the stem on the outside of the body 11. This stuffing box, as shown, consists of a suitable packing 37 (of asbestos or other suitable material), a gland 38, and an internally threaded cap 39 engaging the external thread of the end of the body 11. This stuffing box is provided primarily to compensate for forcible wear between the stem 27 and wall of the bore 19.

The lower or open end of the piston 20 is preferably internally threaded to receive a hollow plug or bushing 40. The top of this plug 40 forms a seat for the valve 22. The valve 22 is normally held on its seat by the spring 23. The tension of the spring 23 should be such as to hold the valve 22 seated against the normal pressure of liquid between the reservoir and the dispenser. This plug extends a suitable distance below the end of the piston 20 to form a suitable support for the coiled spring 50, to prevent its lateral play.

The lower end of the bore 18 is threaded to receive a valve-cage or hollow plug 43 in the valve chamber 44 of which the valve 45 operates. The bottom wall of the chamber 44 is suitably shaped to form a seat 46 for the valve 45. A port 47 communicates up through the valve-seat 46 into the chamber 44. 48 represents a hollow flanged cap, the flange of which extends between the upper end of the plug 43 and the overhanging edge of the wall of the bore 18. This flanged cap is preferably extended up into the bore 18 to form a suitable support for the lower end of the spring 50. 51 represents a threaded opening into the chamber 18. By removing the threaded plug 52 the air may be expelled from the tubes 3 and 4 and from the lower portion of the dispenser and replaced with liquid, when the apparatus is first connected up and the reservoir 1 filled with liquid.

In order to regulate or adjust the stroke of the piston 20 the outer end of the stem 27 is suitably threaded and a regulating nut 55 and a lock nut 55' provided. By adjusting the position of the regulating nut on the stem the stroke or movement of the piston is adjusted as the inner face of this adjusting nut will contact with the outer face of the cap 39 of the stuffing box when the piston is thrown to its innermost position. Preferably the regulator 55 is of the form shown so as to form a housing over the thread at the end of the stem to protect the thread. In Fig. 2 the regulating nut 55 is set at its maximum to permit the maximum stroke of the piston and a maximum delivery of liquid through the nozzle. The lowering of the regulator 55 will reduce the stroke of the piston thereby reducing the quantity discharged by the piston. This regulating mechanism is exceedingly accessible and sensitive so that very quick and close adjustment or regulation can be secured. It is important that the thread on the stem 27 should not extend to any portion of the stem which works into or through the stuffing box.

The operation of the dispenser of Figs. 2 and 4 is as follows: When the dispenser is first set up in position and the reservoir 1 is filled with liquid soap, the threaded plug is partly or wholly removed from the threaded perforation 51 to expel the air from the supply tubes 3, 4 and to fill the interior with liquid soap. A person desiring a supply of liquid soap presses against the button 35 with one hand and holds the other hand, with the palm up, under the outlet of the nozzle. The piston on its inward stroke compresses the liquid in the receiving chamber 18 which closes the foot valve 45, opens the delivery valve 22 and the liquid flows through the chamber 21, channel 33 into the annular space 29, filling the channel of the nozzle and the space above the end of the piston. Upon release of the pressure on the push button 35 the tension of the spring 50 forces the piston outward. The movement of the piston outward forces the liquid out from the discharge chamber 25 formed in the bore 18 between the end of the piston and the walls of the chamber, and through the annular space 29 and the channel 31 of the nozzle 32, the valve 22 having closed upon the commencement of this stroke and being held in its seat by the spring 23.

The valve 22 can remain open only during such time as the piston in its inward stroke exerts pressure on the liquid in the receiving chamber 18 between the end of the piston proper 20, plug 40 and plug 48 and that the moment the inward motion of the piston is stopped this pressure is relieved and the spring 23 seats the valve 22 and no liquid can then flow from the source of supply through the nozzle of the dispenser when the piston is at rest and the dispenser can discharge only a measured or predetermined quantity of liquid upon each stroke of the piston. It is to be observed that no air can be drawn into the operating mechanism of the dispenser during the inward stroke of the piston because all the channels and chambers are at all times full of liquid and the piston on its inward stroke forces the liquid into all such chambers and channels to replace the liquid discharged through the nozzle. All possibility of the dispenser becoming air bound is thereby avoided.

In the modified form of dispenser shown in Figs. 3 and 5 the body 11 is the same as that in Figs. 2 and 4 except that the upper portion of the bore 18 adjacent the wall 26 is recessed to receive a packing 58, which may be a washer made of rubber or any other suitable material. Instead of recessing the stem 27, as shown in Figs. 2 and 4, the stem is of the same diameter and the bore 19 is enlarged to a point slightly above the opening into which the nozzle 32 extends so that the chamber 29 is formed by the increased size of the bore 19. The piston 20 is preferably of the same outside diameter throughout its length and of slightly less diameter than the diameter of the bore 18 so as to provide the annular space or chamber 25 for practically the full length of the piston proper. A series of ports 56 connect the piston chamber 21 directly with the chamber 25. A cap 60 suitably shaped to fit the ball valve 22 is preferably provided with a hub 61 to form a support for the lower end of the spring 23 and a rod 62 of a diameter slightly less than the diameter of the chamber or channel 33 is provided to guide the cap 60 in axial position in relation to the chamber 21. The rod 62 works in the channel 33 which channel in this case is closed at its top, the ports of the form of Figs. 2 and 4 being omitted. The valve 22, cap 60, hub 61 and rod or stem 62 may, if desired, all be formed in one piece. The plug 40 is provided with an extension or flange 63 shaped to accommodate a packing or cup 64 made of leather or any suitable material. The plug 40 when screwed into the chamber 21 holds the packing or cup 64 in position and forms an operative portion of the piston, the cup 64 having a close working fit with the wall of the bore 18. The supply tube 4 is connected to the dispenser by means of a union 7 comprising a tubular body 65 provided with a flange 66 and a nut 67. A rubber washer 58 may be interposed between the bodies 11 and 65 to make a tight joint. The threaded opening 51 and the cap screw 52 for expelling the air may be located in the body 11, as shown in Fig. 2, or in the cylindrical body 65, as shown in Fig. 3.

The operation of the dispenser of Figs. 3 and 5 is the same as that of Figs. 2 and 4, except that on the inward stroke of the piston the liquid passes from the chamber 21 into the annular space or chamber 25. With the construction of Figs. 3 and 5 the hub 24 acts as an auxiliary valve to prevent leakage from the nozzle when the dispenser is not in use, should any liquid pass through the space between the piston and the wall of the bore 18 by reason of any wear of the piston or packing, or, should any liquid pass through the valve 22 by reason of any wear of the valve or its seat, or should a particle of dirt lodge itself on the valve seat, or should the spring 23 fail to properly close the valve 22.

In Figs. 6 and 7 we have shown a horizontal type of dispenser particularly adapted for attachment above the wash basin in a position parallel or nearly so with the top of the basin. With such a dispenser the main supply tube may follow alongside or within the wall either above or below the basin.

In this embodiment of our invention the tubular body 11 is provided with an extension 70, having within its walls a chamber 71 from the bottom of which the valve chamber 44 and a channel 72 extend downwardly, the latter connecting with the receiving chamber 18. An extension 73, provided with a bore 74 projects from the extension 70 and is adapted to be secured to the supply tube by suitable means. The bottom of the valve chamber 44 is suitably shaped to form a seat for the valve 45. The valve opening 75 connects the valve chamber 44 and the channel 76 which in turn leads to the bore 74. Communication is thus established between the source of liquid supply and the receiving chamber 18 of the dispenser through the bore 74, channel 76, inlet 75, valve chamber 44, chamber 71 and channel 72, when the valve 45 is raised from its seat by the gravity or pressure of the liquid in the supply reservoir. Preferably the chamber 71 is closed by a removable cap 77. By wholly or partially removing this cap 77 the air from the tubes 3, 4 may be expelled. This cap 77 corresponds in this function to the plug 52 of Figs. 2 and 4. A plug 78 closes the open end of the receiving chamber 18. The piston 20 and the piston rod 27 may be either of the forms shown in Fig. 2 or Fig. 3.

The delivery mechanism comprises the valve 79, preferably provided with a hub 61 and two rods 80, 80' which serve as guides for the valve 79. A bushing 81 is screwed into the end of the piston or plunger 20. The inner end of this bushing 81 serves as a valve seat. A washer 82 may be interposed between the valve 79 and this valve seat. A plug 83 is screwed into the bushing 81 and is so formed on its outside as to accommodate the packing or cup 64 and is also provided with a channel 84 and with one or more perforations or ports 85 in its side wall and with a perforation 86 in its end wall. This perforation 86 is of a diameter slightly greater than that of the guiding rod 80' to serve as a guiding channel for the rod 80'. The channel 33 serves as a guide for the rod 80. The valve 79 is thus held in axial position in relation to the chamber 21 and the valve seat 82 when opening or closing. The perforations or ports 85 serve as passages for the liquid from the receiving chamber 18 into the piston chamber 21 when the valve 79 is raised by the compressed liquid on the inward stroke of the piston. 32 indicates a suitable nozzle, the channel 31 of which connects with the chamber or channel 29.

The operation of this horizontal dispenser is substantially the same as the dispenser of Fig. 3 except that it can be operated with one hand. The person desiring a supply of liquid soap pushes inwardly on the push button with the base of the palm of the hand, holding the palm under the discharge nozzle and receives in the palm of the hand the charges of liquid soap.

In the modified form of dispensing device shown in Figs. 8 and 9 the foot valve is omitted and provision is made for opening the discharge valve 79, in the piston 20, by positive action instead of by the compression of the liquid in the receiving chamber by the force of the piston on its inward stroke, as in the construction illustrated in Figs. 2 to 7. For this purpose the open end of the receiving chamber 18 is closed with a plug 87, provided with a channel 88, the inner end of which is closed to form an anvil or stop 89. The diameter of the inner end of the plug 87 is contracted to form a hub 90, and one or more perforations or ports 91 connect the channel 88 with the receiving chamber 18. When the valve 79 is seated the guiding rod 80' extends outside the plug 83 about half way between the top of the anvil 89 and the bottom of said plug 83.

The piston rod 27 is provided with a recess 92 to form an annular space or chamber between the recessed portion of the piston rod and the wall of the bore 19.

The operation is as follows: The person desiring a supply of liquid soap pushes the push button inwardly thus forcing the piston inwardly until the end of the guiding rod 80' reaches the anvil 89; the further advance of the piston, with the rod 80' resting on the anvil, holds the valve 79 stationary and the further inward movement of the piston thus opens the valve 79. The pressure of the column of liquid from the reservoir being direct to the liquid in the chamber 18 such liquid flows into the piston chamber 21 and into the space above the piston, vacated by the piston. When the pressure of the push button is released and the piston by the tension of the spring is pushed outwardly the valve 79 remains open until the piston has reached a point at which the rod 80' will lift itself from the anvil. The liquid entrapped in the chamber above the piston will be forced out through the nozzle by the further advance of the piston. To prevent a continuous flow of the liquid from the nozzle when the valve 79 is open the distance of the extension of the guiding rod 80' outside the plug 83 and the length of the recess 92 in the piston rod are so gaged that the moment the guiding rod 80' reaches the anvil the end 93 of the recess closes the outlet 30. It is understood that about half of the motion of the piston on its inward stroke and about half of its motion on the outward stroke are lost.

With the construction shown in Figs. 2 and 4, the valve hub 24, when seated against the wall 26, prevents possibility of the liquid dripping from the dispenser due to leakage through between the piston and the wall of the hollow body 11. In this form the valve 22 is depended upon to shut off the main supply from the outlet. In the forms illustrated in Figs. 3, 5, 6, 7, 8 and 9, this hub portion or valve 24 positively prevents all passage of the liquid out of the dispenser when the piston is in its outward or closed position. It is thus obvious that by means of this hub or valve 24 formed on the end of the piston, provision is made against any wear of the surface of the piston or of the packing or piston head 64, and it is not necessary that these parts should fit with such extreme nicety as would be otherwise required in order to prevent either leakage or drippage. It is also obvious that not only does the spring 50 exert its tension to hold this valve or hub 24 in contact with the wall 26 or with the interposed washer or packing 58, but that the pressure of the liquid from the reservoir also assists in holding this valve closed on its seat.

We claim:

1. A liquid dispenser comprising a reservoir and a hollow body connected thereto and having a hollow piston, a charge-receiving chamber formed at one end of said piston, a discharge chamber formed at the other end thereof, a passage through said piston connecting said chambers, a valve controlling the passage from said reservoir to said receiving chamber, a valve controlling said passage through said piston, an outlet from said discharge chamber, and means carried by said piston for closing communication from said discharge chamber to said outlet when the piston is in its outward position.

2. A liquid dispenser comprising a reservoir and a hollow body connected thereto having a receiving chamber, a valve within said chamber to close the inlet passage thereof against the liquid backing out therefrom, a spring-returned reciprocating piston, a passage in said piston between said chambers, a valve automatically closing said last named passage upon the return stroke of said piston, and an outlet from said discharge chamber, said piston provided with means for closing communication between said discharge chamber and said outlet when said piston is in retracted position.

3. In combination a hollow body provided with an inlet and an outlet and with a piston-stem bore, a hollow piston mounted therein and having its stem extending through said bore and forming an operating means, a valve within said body adapted to close said inlet upon the inward stroke of said piston, a spring exerting its tension to force said piston outward, a liquid receiving chamber formed between said inlet and the inner end of said piston, a discharge chamber formed between the upper portion of said piston and the inner wall of the body, a valve within said piston, a valve-stem therefor for centering the valve, and a spring surrounding said valve-stem and exerting its tension to seat said valve upon the walls of the passage through said piston.

4. In combination a hollow body provided with an inlet and an outlet and with a piston-stem bore, a hollow piston having its stem extending through and out from said bore, a valve within said body adapted to close said inlet upon the inward stroke of said piston, a spring for normalizing said piston, a liquid receiving chamber formed between said valve and the end of said piston, a discharge chamber formed between the upper portion of said piston and the inner wall of the body, a valve within said piston adapted to close the passage through said piston from said receiving to said discharge chamber, a portion of the piston-stem being hollowed out to form a channel, a valve-stem extending within the passage of said piston and into said piston-stem channel, and a spring surrounding said valve-stem and exerting its tension to seat said valve to close said piston passage.

5. In combination a hollow body having an inlet and an outlet and a piston stem bore, a hollow piston open at one end and having a stem extending through said bore and outside said body, a chamber being formed between the surface of said piston and the wall of said body about the upper portion of said piston, a port leading from the chamber of said piston near the stem end thereof, a hollow plug partially closing the inner end of said piston, a spring-actuated valve in said piston, a second chamber formed below said plug, and a spring mounted in said second chamber adapted to exert its tension to force said piston outwardly.

6. In combination a hollow body having an inlet and an outlet and a piston stem bore, a hollow piston open at one end and having a stem extending through said bore and outside said body, a chamber being formed between the surface of said piston and the wall of said body about the upper portion of said piston, a port leading from the chamber of said piston near the stem end thereof, a hollow plug partially closing the inner end of said piston, a spring-actuated valve in said piston, a second chamber formed below said plug, a spring mounted in said second chamber adapted to exert its tension to force said piston outwardly, and a valve arranged to close said inlet upon the inward stroke of said piston.

7. The combination with a body having an open ended bore, the outer portion of the bore reduced in diameter, of a piston mounted in said bore and having a longitudinal bore open at one end and a stem extending into and through said smaller bore and out beyond said body to form an operating means, an annular channel formed between the wall of such smaller bore and the inner portion of such stem, a port connecting the bore of said piston to said annular channel, a spring-actuated valve mounted in the bore of said piston, a plug mounted in the open end of said piston and forming a seat for said valve, a plug mounted in the open end of said body and having an inlet passage, a valve arranged to close said inlet passage on the inward stroke of the piston, and a spring interposed between the lower end of said piston and said last-named plug and arranged to exert its tension to move said piston to its outer position.

8. The combination with a body having a central bore of two diameters, of a piston having a longitudinal bore open at one end and a stem extending into and through the smaller bore of said body and out beyond said body, a port connecting the bore of said piston to the bore of said body toward the upper end of said piston, a packing against which the upper end of said piston seats, a plug mounted in the open end of said piston and forming a valve seat, a valve and valve stem in said piston, a spring surrounding said valve stem and exerting its tension to hold said valve seated on said plug, a plug mounted in the open end of said body and provided with an inlet passage, a valve arranged to close said inlet passage on the inward stroke of the piston, a spring interposed between the lower end of said piston and said last-named plug and arranged to exert its tension to move said piston to its outer position.

9. A liquid dispenser comprising a source of supply adapted to furnish liquid under pressure, a hollow body connected thereto and provided with an outlet, a piston in said hollow body separating said hollow body into a receiving chamber and a discharge chamber, the end of said piston forming a valve to positively close the discharge chamber when the piston moves to the end of its outward stroke, a valved passage between said receiving and discharge chambers, and means for reciprocating said piston.

10. A liquid dispenser comprising a reservoir adapted to supply liquid under pressure, a hollow body connected thereto and provided with an outlet, a reciprocating piston, said hollow body provided with a receiving and a discharge chamber, a valved passage between said chambers controlled by the movement of said piston, a valve controlling the passage of liquid from said reservoir to said receiving chamber, said body provided with an opening whereby the air may be expelled from the connections between said reservoir and hollow body when the apparatus is started into operation, and means for closing said opening.

11. A liquid dispenser comprising a reservoir and means located at a distance therefrom and connected thereto for dispensing measured charges of liquid, an opening in said means whereby the air in said dispenser may be expelled when the same is filled with liquid, and means for closing such opening.

12. A liquid dispenser having a reservoir, a hollow body connected thereto and having a hollow piston, a charge receiving chamber formed at one end of said piston, a valve to close the passage from said reservoir into said receiving chamber, a discharge chamber formed at the other end of said piston, a valve controlling the passage between said chambers, and a valve seat in said hollow body on which the end of said piston seats at the termination of its outward movement.

Signed at Los Angeles, California, this 12th day of February, 1916.

GABRIEL A. BOBRICK.
ARTHUR L. BOBRICK.

Witnesses:
FREDERICK S. LYON,
L. BELLE WEAVER.